J. C. CARPENTER.
FRUIT AND VEGETABLE WASHER.
APPLICATION FILED FEB. 14, 1910.
1,059,030.
Patented Apr. 15, 1913.
3 SHEETS—SHEET 1.
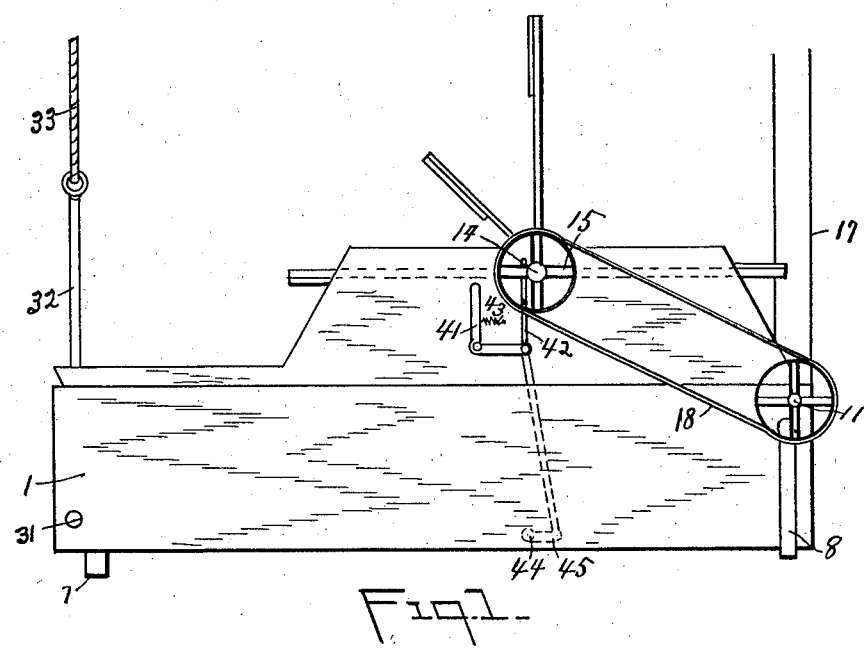
Fig. 1.
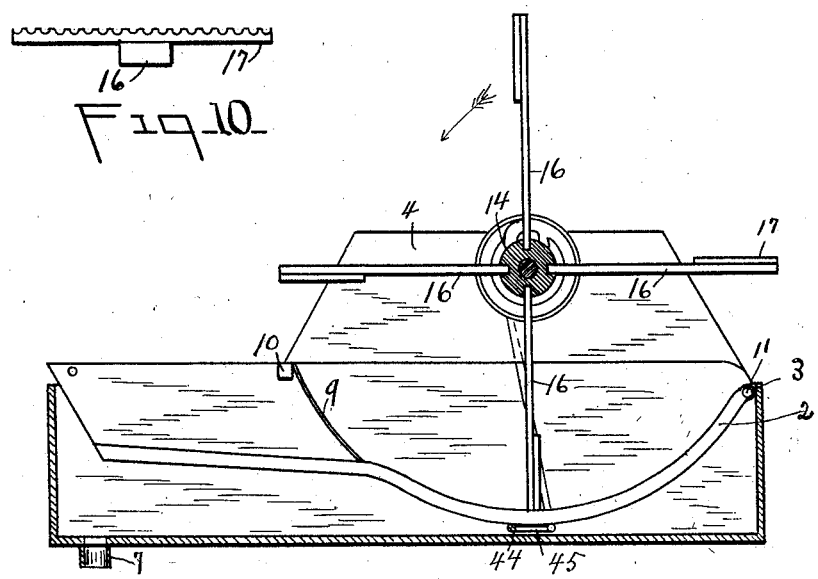
Fig. 10.
Fig. 2.
WITNESSES:
INVENTOR
John C. Carpenter.
BY
Hardway & Cathey
ATTORNEYS J. C. CARPENTER.
FRUIT AND VEGETABLE WASHER.
APPLICATION FILED FEB. 14, 1910.
1,059,030.
Patented Apr. 15, 1913.
3 SHEETS—SHEET 2.
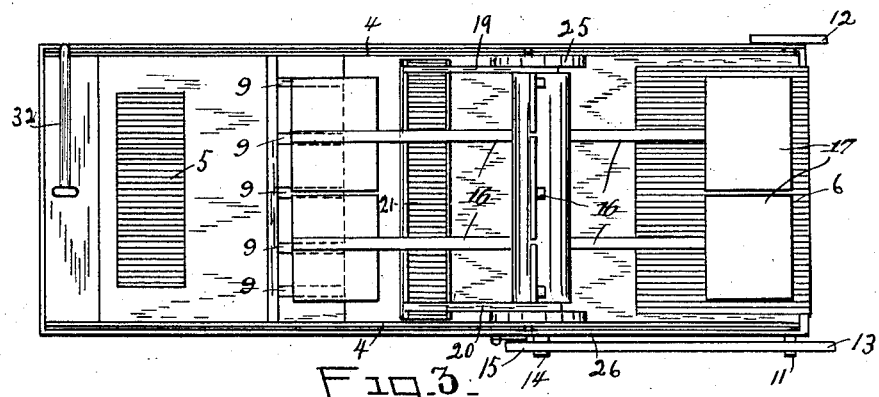
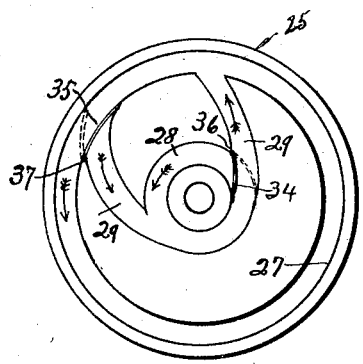
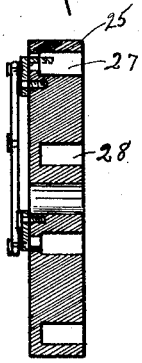
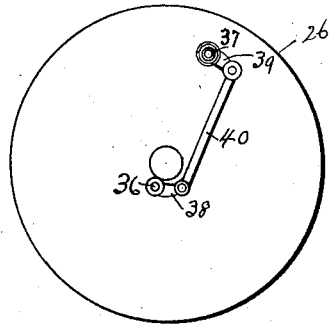
Fig. 4.    Fig. 5.    Fig. 6.
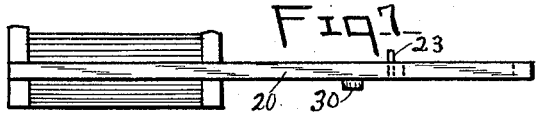
Fig. 7.
Fig. 8.
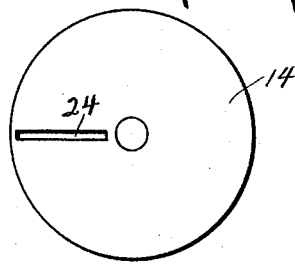
Fig. 9.
WITNESSES:
Ernest C. Guy.
Mabel C. Emery.
INVENTOR
John C. Carpenter
BY
Hardway & Cathey
ATTORNEYS

J. C. CARPENTER.
FRUIT AND VEGETABLE WASHER.
APPLICATION FILED FEB. 14, 1910.

1,059,030.

Patented Apr. 15, 1913.

3 SHEETS—SHEET 3.

WITNESSES:
G. T. Dougherty.
E. Schuller.

INVENTOR
John C. Carpenter
BY
Hardway & Cacheu
ATTORNEYS.

UNITED STATES PATENT OFFICE.

JOHN C. CARPENTER, OF HOUSTON, TEXAS.

FRUIT AND VEGETABLE WASHER.

1,059,030. Specification of Letters Patent. Patented Apr. 15, 1913.

Application filed February 14, 1910. Serial No. 543,732.

*To all whom it may concern:*

Be it known that I, JOHN C. CARPENTER, citizen of the United States, residing at Houston, in the county of Harris and State of Texas, have invented certain new and useful Improvements in Fruit and Vegetable Washers, of which the following is a specification.

My invention relates to new and useful improvements in fruit and vegetable washers, and more particularly to such devices as will also remove the skin therefrom by the process of friction.

The object of the invention is to provide a device of the character described provided with agitators, which may be manually or mechanically operated, said agitators being provided with friction members operating in the fruit receptacle and against the contents thereof thereby also causing friction between the individuals of said contents.

Another feature resides in the provision of a means for discharging the contents of said receptacle either manually or automatically.

Figure 11:
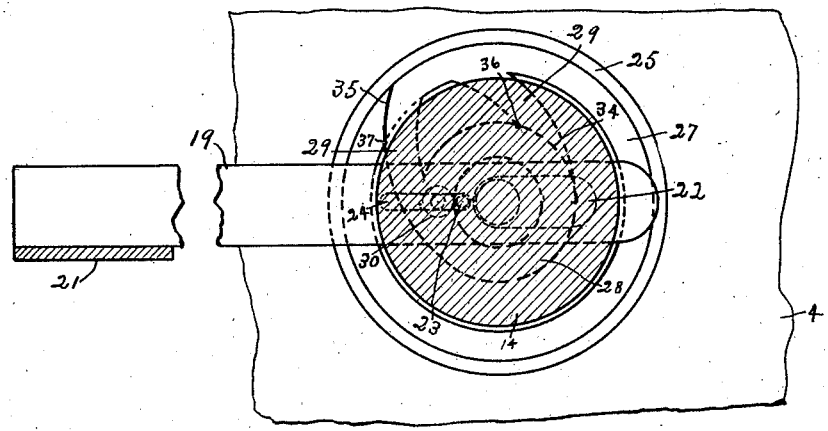
Figure 12:
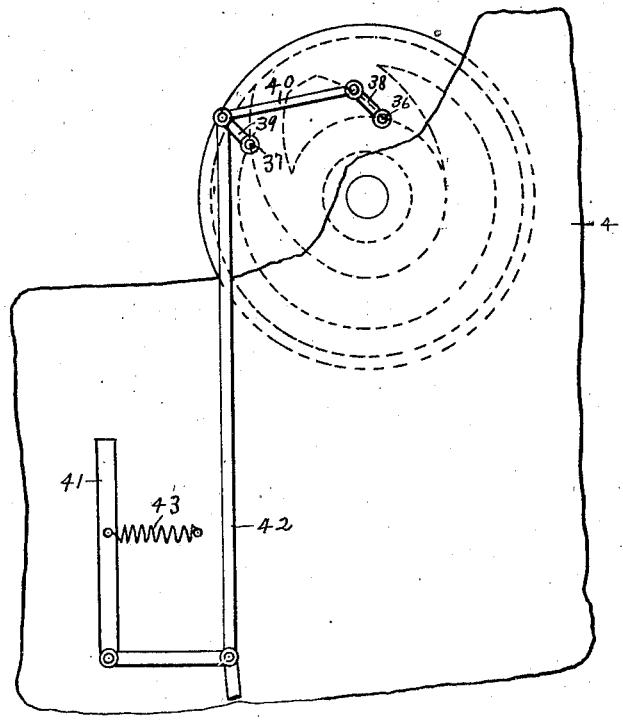

With the above and other objects in view my invention has particular relation to certain novel features of construction and operation an example of which is given in this specification and illustrated in the accompanying drawings, wherein:

Figure 1 is a side elevation of the complete device. Fig. 2 is a side elevation thereof with the side members removed. Fig. 3 is a plan view thereof with the agitators removed. Fig. 4 shows the face of the cam members which actuate the automatic discharger. Fig. 5 is a sectional view thereof. Fig. 6 is a back view thereof. Fig. 7 is a side elevation of the discharger. Fig. 8 is a partial plan view thereof. Fig. 9 is an end view of the shaft which supports the agitators. Fig. 10 shows an end view of one of the agitators. Fig. 11 is a detail of the discharger operative mechanism, and Fig. 12 is a detail of the mechanism for operating the switches of the discharger operative mechanism.

Referring more particularly to the drawings wherein like numerals of reference designate similar parts in each of the figures, the numeral 1 refers to the external tank or casing, which is composed of suitable side, end and bottom members. Within this tank the dump box 2 is located and is hingedly attached thereto at the point 3. This dump box is composed of suitable side members and is provided at one end with a concaved bottom or receptacle and at the other with a declining bottom leading to said receptacle as shown in Fig. 2. The bottom of this box is provided with suitable wire lattice work as is indicated by the numerals 5 and 6, Fig. 3 provided for fluid passage from the tank, and said tank has a suitable drain 7 and overflow pipe 8. This dump box is separated into two portions by means of an open portion consisting of a plurality of arcuate guards 9 extending from the cross brace 10 to the bottom of the box, and provided for a purpose hereinafter to be set forth. This dump box is hinged upon the transversely disposed drive shaft 11 which operates in bearings in the side members of the casing, as shown in Fig. 3, and which carries at either end drive sprockets 12 and 13 rigidly mounted thereon.

That portion of the side members 4 of the dump box, inclosing the receptacle thereof projects upwardly above the sides of the tank and is provided with suitable bearings for the transverse shaft 14 whose internal portion is enlarged to provide a suitable support for the agitators, and one end thereof projects beyond its bearing and carries a sprocket wheel 15 rigidly mounted thereon.

The agitators each include an arm 16, secured to the enlarged portion of the shaft 14, and a paddle 17 secured to the free end thereof. This paddle is composed of some flexible material such as sheet rubber and has its operative face corrugated or roughened, as shown in Fig. 10.

Rotation is imparted to shaft 11 through sprocket 12, and from said shaft through sprocket 13 chain 18 and sprocket 15 to shaft 14 and to the agitators; and it is to be observed that the shaft 14 is so positioned relative to the receptacle and the arms 16 are of such a length that the paddles 17 will sweep entirely around the receptacle walls in their revolution.

The discharger partially shown in Figs. 7 and 8 includes two arms 19 and 20, Fig. 3 supporting at their free ends an open wire sweep 21, as shown. Each of these supporting arms is provided with an oblong slot 22, through which the reduced ends of shaft 14 extend. These slots permit the discharger to move longitudinally, relative to the shaft, and each of said arms is provided with an inwardly extending stud 23 which projects into an oblong recess 24, provided in each end of the enlarged portion of said shaft 14, and causes the discharger to rotate with shaft 14.

Secured upon the inner walls of the upwardly extending sides of the dump box and concentric with the axis of shaft 14, I have secured the circular cam members 25 and 26 similar to each other and shown in detail in Figs 4, 5, and 6. The faces of each of these members are provided with two circular grooves 27 and 28 of different diameters but concentric with said members. These grooves are connected by a cam shaped groove 29 for a purpose to be hereinafter set forth, and each of the arms 19 and 20 carries an inwardly extending stud 30 which operates in said grooves in a manner presently to be described.

The fruit or vegetables to be treated are first blanched in hot fluid in a suitable vat and then transferred to the declining bottom of the dump box and gradually move along said bottom to the receptacle at its other end passing between the guards 9. These guards serve as paths for the free ends of arms 16 and prevent them from pinching or bruising the fruit to be treated. It is observed that the casing and dump box are well filled with fluid which is being constantly admitted through inlet 31 and discharged through overflow 8 so as to provide a free circulation of fluid through the receptacle.

The agitators rotate as indicated in Fig. 2 and their paddles pass among the contents of the receptacle causing friction between said contents and the paddles as well as friction between the individuals of the contents. As the paddles are flexible their free sides are retarded by the contents of the receptacle which prevents said contents from being forced out of the receptacle and conduces to better agitation and more friction. When the fruit or other contents has been relieved of the skin the free end of the dump box is elevated and the contents dumped therefrom. This operation may be performed manually or mechanically as is desired. In case the dumping is performed mechanically the free end of the dump box should be provided with an upwardly extending elbow 32 to the free end of which a cord 33 is secured.

I have provided the discharger hereinbefore referred to, to assist in relieving the receptacle of its contents. During the process of agitation the studs 30 of the discharger arms travel in grooves 28 and the sweep 21 is held withdrawn from contact with the receptacle contents, but when it is desired to dump the contents from the receptacle the groove 28 is closed by switch 34 and studs 30 are forced to travel in the grooves 29 to the outer groove 27 the arms 19 and 20 thus moving longitudinally on their supporting shaft and their free ends and the sweep 21 projecting farther from the shaft and to the walls of the receptacle. Another switch 35 closes the entrance passage from the groove 27 to groove 29, as shown in Fig. 4, and serves to keep the studs 30 in grooves 27 and thus holds the discharger to the limit of its outward projection. When the discharge is complete the position of the switches is reversed and they assume the position shown by the dotted lines of Fig. 4 and studs 30 are permitted to return to groove 28 in which they continue to travel until the position of the switches is again reversed, the discharger in the meantime remaining withdrawn. These switches 34 and 35 are pivoted upon the face of the cam members at the points 36 and 37 respectively, by means of studs which extend through the cam members and which carry arms 38 and 39 rigidly secured thereto. The free ends of their arms are connected by a link 40, pivotally secured to said arms in such a manner that a movement of the link in one direction will serve to move the switch 34 to close groove 28 and move switch 35 to open groove 27 and an opposite movement of the switch will cause the reverse movement of said switches.

In order to manipulate said link and the switches connected therewith, I have secured upon each side of the dump box a bell crank 41 to one end of which is attached the link 42 whose other end is secured to the link 40. The other arm of each bell crank serves as a hand lever by means of which the same may be manipulated. The switches are normally held in the position indicated by the dotted lines in Fig. 4 and I have provided pull springs 43 one end of each of which is secured to the side members of the dump box and the other to the arms of the bell cranks 41, and serves to hold them in their normal position.

Transversely disposed across the bottom of the receptacle and operating in bearings in the side members thereof I have provided the shaft 44, each end of which carries an arm 45 rigid therewith. Each of these arms 45 is connected to the operative arm of its respective bell crank 41 so that when either bell crank is manipulated a similar movement will be imparted to the switches of each member.

When it is desired to bring the dischargers into operation the bell crank is manipulated against the tension of pull spring 43 and the switches are forced into the position they are shown to occupy in Fig. 4 and when said bell crank is released the switches assume their normal position through the operation of said pull springs.

It should be observed that in practical operation the process of dumping is performed manually or mechanically as hereinbefore set out, the receptacle being relieved of its contents by the force of gravity and I have provided the discharger only for the purpose of assisting in the discharge although the receptacle may be entirely vacated by the discharger if it is so desired.

A device made in accordance with this specification and the drawings accompanying the same and made a part thereof will be found to be simple in construction and efficient in operation, thus possessing the two prime virtues sought to be attained to-wit: cheapness of manufacture and effectiveness of results.

What I claim is:

1. A device of the character described including a casing and a liquid receptacle carried thereby, a rotatable shaft disposed above said receptacle and provided with radiating arms, flexible paddle shaped members extending laterally from the extremities of said arms and arranged to pass through the receptacle contents and to be flexed thereby relative to the said arms.

2. A device of the character described including a fluid receptacle and a rotatable support disposed thereabove, radiating arms carried by said support and disposed to pass through the receptacle contents as said support rotates, laterally extending flexible friction members carried by said arms and forming substantially a continuous paddle and whose free ends are retarded relative to the supporting arms by the receptacle contents during their movement therethrough.

3. In a device of the character described the combination with a receptacle of an agitator disposed thereabove; said agitator including a central support, radiating members carried thereby, and flexible friction members carried by the free ends of said radiating members, and a radially movable discharger carried by said central support.

4. In a device of the character described the combination with a receptacle of an agitator disposed thereabove; said agitator including a central support, radiating members carried thereby, and flexible friction members carried by the free ends of said radiating members, and a radially movable discharger carried by said central support, and means for operating the discharger.

5. A device of the character described composed of the following instrumentalities, to-wit: a casing; a dumping receptacle pivotally mounted therein; a means for tilting said receptacle on its pivot support; a rotatable agitator disposed above the receptacle and means for rotating the same, said agitator including a central shaft and radiating arms carried thereby and flexible paddles carried by the free ends of said arms; guards carried by said receptacle disposed to coincide with the path of the free ends of the arms; a radially movable discharger carried by said central support and means for operating said discharger.

6. A device of the character described including a fluid receptacle and a rotatable agitator support disposed above the same, radiating agitators carried by said support and arranged to pass through said receptacle as the support rotates, flexible friction members extending laterally from said support and each forming substantially a continuation of the other whose operative faces are corrugated and whose free ends are retarded relative to the support by the contents of said receptacle.

7. In a device of the character described the combination with a receptacle of an agitator disposed thereabove, said agitator including a support, agitating members radiating therefrom, and flexible friction members carried by the free ends of said radiating members, and a radially movable discharger carried by said agitator.

8. In a device of the character described the combination with a receptacle of an agitator disposed thereabove, said agitator including a support, agitating members radiating therefrom, and friction members carried by the free ends of said radiating members, and a radially movable discharger carried by said agitator.

9. In a device of the character described the combination with a receptacle, of an agitator disposed thereabove, said agitator including a support, agitating members extending therefrom and flexible friction members carried by the free ends of said agitating members and a radially movable discharger carried by said agitator.

10. A device of the character described, including a liquid receptacle and a rotatable support disposed thereabove; radiating arms carried by said support and disposed to sweep through the receptacle contents as said support rotates; a sheet of flexible material, carried by the extremity of each arm and extending laterally with respect thereto and axially with respect to said support, whose free ends are retarded relative to the supporting arms by the receptacle contents during their movement therethrough.

11. A device of the character described including a liquid receptacle and a rotatable support disposed thereabove, radiating arms carried by said support and disposed to sweep through the receptacle contents as said support rotates; a lateral extension carried by the free end of each of said arms composed of flexible material and arranged to sweep through the receptacle contents and be retarded thereby relative to their supporting arms.

12. A device of the character described including a casing and a receptacle carried thereby; a rotatable member disposed above said receptacle, radiating arms carried by said member; a lateral extension carried by the free end of each arm, said extensions being composed of flexible material and being so located as to sweep through the receptacle contents and be retarded by said contents relative to its supporting arms.

13. A device of the character described including a casing and a pivotally mounted receptacle carried thereby; a rotatable shaft disposed above said receptacle, radiating arms carried by said shaft; flexible lateral extensions carried by the free ends of said arms and arranged to sweep through the receptacle contents as the shaft rotates, the free portions of said extensions being retarded by said contents relative to their supporting arms.

14. A device of the character described including a liquid receptacle whose bottom is concaved and a rotatable support disposed thereabove, radiating arms carried by said support and disposed to pass through said receptacle as the support rotates and whose free ends sweep around said concaved bottom, flexible lateral extensions carried by said arms which sweep through the receptacle contents as the support rotates and are retarded thereby relative to their supporting arms.

In testimony whereof I have signed my name to this specification in the presence of two subscribing witnesses.

JOHN C. CARPENTER.

Witnesses:
P. E. HEBERT,
M. C. EMERY.

---

Copies of this patent may be obtained for five cents each, by addressing the "Commissioner of Patents, Washington, D. C."